(12) United States Patent
Moran et al.

(10) Patent No.: US 7,899,443 B2
(45) Date of Patent: Mar. 1, 2011

(54) MULTI-ACCESS SOLID STATE MEMORY DEVICES AND A TELEPHONE UTILIZING SUCH

(75) Inventors: Dov Moran, Kefar Saba (IL); Mordechai Teicher, Hod Hasharon (IL)

(73) Assignee: Modu Ltd., Kfar Saba (IL)

( * ) Notice: Subject to any disclaimer, the term of this patent is extended or adjusted under 35 U.S.C. 154(b) by 22 days.

(21) Appl. No.: 12/512,621

(22) Filed: Jul. 30, 2009

(65) Prior Publication Data

US 2009/0298520 A1 Dec. 3, 2009

Related U.S. Application Data

(60) Continuation of application No. 12/233,618, filed on Sep. 19, 2008, now Pat. No. 7,693,548, which is a division of application No. 10/359,489, filed on Feb. 6, 2003, now Pat. No. 7,433,712.

(51) Int. Cl.
*H04M 11/10* (2006.01)

(52) U.S. Cl. ............ 455/413; 455/412.1; 455/412.2; 455/557; 709/200; 705/3

(58) Field of Classification Search ....... 455/412.1–415, 455/557, 446, 556; 709/200, 204, 206; 705/3, 705/51

See application file for complete search history.

(56) References Cited

U.S. PATENT DOCUMENTS

| | | |
|---|---|---|
| 5,189,632 A | 2/1993 | Paajanen et al. |
| 5,634,005 A * | 5/1997 | Matsuo .................. 709/206 |
| 5,745,750 A | 4/1998 | Porcaro |
| 5,748,084 A | 5/1998 | Isikoff |
| 5,946,326 A | 8/1999 | Rinne |
| 6,014,688 A * | 1/2000 | Venkatraman et al. ....... 709/206 |
| 6,128,661 A | 10/2000 | Flanagin et al. |
| 6,138,146 A * | 10/2000 | Moon et al. .................. 709/206 |
| 6,195,686 B1 * | 2/2001 | Moon et al. .................. 709/206 |
| 6,219,694 B1 | 4/2001 | Lazaridis et al. |
| 6,269,371 B1 | 7/2001 | Ohnishi |
| 6,272,545 B1 | 8/2001 | Flanagin et al. |
| 6,304,897 B1 * | 10/2001 | Venkatraman et al. ....... 709/206 |
| 6,308,062 B1 | 10/2001 | Chien et al. |
| 6,362,610 B1 | 3/2002 | Yang |
| 6,377,790 B1 | 4/2002 | Ishii |
| 6,408,351 B1 | 6/2002 | Hamdi et al. |
| 6,427,078 B1 | 7/2002 | Wilska et al. |
| 6,434,535 B1 | 8/2002 | Kupka et al. |

(Continued)

FOREIGN PATENT DOCUMENTS

WO 0141409 A1 6/2001

(Continued)

OTHER PUBLICATIONS

Kyocera 7135; Smartphone Product Detail Page; Retrieved from the Internet <http:///www.kyocera-wireless.com/showroom/showcase/coming_soon7135.htm>; Oct. 9, 2002; pp. 1-2.

(Continued)

*Primary Examiner* — Minh D Dao
(74) *Attorney, Agent, or Firm* — Soquel Group LLC

(57) ABSTRACT

A method of sending e-mail from a computer, including attaching a telephone to a computer, saving at least one e-mail message from the computer on the telephone, activating the telephone, and automatically sending the e-mail message after the activating.

13 Claims, 11 Drawing Sheets

U.S. PATENT DOCUMENTS

| | | | |
|---|---|---|---|
| 6,459,778 B1 | 10/2002 | Shirai | |
| 6,650,534 B2 | 11/2003 | Tree | |
| 6,782,245 B1 | 8/2004 | Lazzarotto et al. | |
| 6,879,824 B1* | 4/2005 | Otsubo et al. | 455/414.1 |
| 6,898,426 B2 | 5/2005 | Matsuoka | |
| 6,928,302 B1 | 8/2005 | Kinney et al. | |
| 6,980,798 B2* | 12/2005 | Kido | 455/412.1 |
| 6,999,792 B2 | 2/2006 | Warren | |
| 7,433,712 B2 | 10/2008 | Moran et al. | |
| 2001/0021659 A1 | 9/2001 | Okamura | |
| 2001/0040960 A1 | 11/2001 | Hamami et al. | |
| 2001/0041592 A1 | 11/2001 | Suonpera et al. | |
| 2002/0073140 A1 | 6/2002 | Chae | |
| 2002/0090068 A1 | 7/2002 | Song | |
| 2002/0111179 A1 | 8/2002 | Tanaka et al. | |
| 2002/0123359 A1 | 9/2002 | Wei et al. | |
| 2002/0137506 A1 | 9/2002 | Matsuoka | |
| 2003/0013411 A1 | 1/2003 | Uchiyama | |
| 2003/0017816 A1 | 1/2003 | Souetinov | |
| 2003/0126220 A1 | 7/2003 | Wanless | |
| 2003/0167229 A1* | 9/2003 | Ludwig et al. | 705/40 |
| 2003/0188196 A1* | 10/2003 | Choi | 713/201 |
| 2003/0195933 A1* | 10/2003 | Curren et al. | 709/206 |
| 2003/0219029 A1* | 11/2003 | Pickett | 370/442 |
| 2003/0228860 A1 | 12/2003 | Jou | |
| 2003/0233507 A1 | 12/2003 | Yu et al. | |
| 2003/0234651 A1* | 12/2003 | Nguyen | 324/500 |
| 2004/0001501 A1* | 1/2004 | Delveaux et al. | 370/442 |
| 2004/0002301 A1* | 1/2004 | Ross et al. | 455/2.01 |
| 2004/0015555 A1* | 1/2004 | Petrank | 709/206 |
| 2004/0034446 A1* | 2/2004 | Divine et al. | 700/226 |
| 2004/0036907 A1* | 2/2004 | Simpson et al. | 358/1.15 |
| 2004/0060005 A1* | 3/2004 | Vasey | 715/513 |
| 2004/0078783 A1* | 4/2004 | Matsushima | 717/126 |
| 2004/0086093 A1 | 5/2004 | Schranz | |
| 2004/0127254 A1 | 7/2004 | Chang | |
| 2004/0137919 A1 | 7/2004 | Biundo | |
| 2004/0139161 A1* | 7/2004 | Loh | 709/206 |
| 2004/0147282 A1 | 7/2004 | Nakasato et al. | |
| 2004/0157638 A1* | 8/2004 | Moran et al. | 455/550.1 |
| 2004/0192332 A1 | 9/2004 | Samn | |
| 2004/0225515 A1* | 11/2004 | Wu | 705/1 |
| 2004/0228189 A1 | 11/2004 | Cheung | |
| 2004/0240434 A1* | 12/2004 | Sato et al. | 370/352 |
| 2004/0249962 A1* | 12/2004 | Lecomte | 709/229 |
| 2005/0009465 A1* | 1/2005 | Ross et al. | 455/2.01 |
| 2005/0021633 A1* | 1/2005 | Venkatraman et al. | 709/206 |
| 2005/0086410 A1 | 4/2005 | Landron et al. | |
| 2005/0152378 A1* | 7/2005 | Bango et al. | 370/400 |
| 2005/0210181 A1* | 9/2005 | Depke et al. | 711/100 |
| 2005/0210256 A1* | 9/2005 | Meier et al. | 713/176 |
| 2006/0221959 A1* | 10/2006 | Sumiyoshi | 370/389 |
| 2006/0235953 A1 | 10/2006 | Meier | |
| 2006/0247952 A1* | 11/2006 | Muraca | 705/3 |
| 2010/0151835 A1* | 6/2010 | Esteve Balducci et al. | 455/413 |

FOREIGN PATENT DOCUMENTS

| | | |
|---|---|---|
| WO | 0219626 A2 | 3/2002 |
| WO | 02062035 A2 | 8/2002 |
| WO | 02076171 A2 | 9/2002 |

OTHER PUBLICATIONS

Nokia 9290 Communicator User Guide; "Flight Profile;" Feb. 2002; pp. 113-114; Retrieved from the Internet <http://downloads.nokiausa.com/userguides/9290.PDF>.

* cited by examiner

MULTI-ACCESS SOLID STATE MEMORY DEVICES AND A TELEPHONE UTILIZING SUCH

CROSS REFERENCE TO RELATED APPLICATIONS

This application is a continuation of U.S. application Ser. No. 12/233,618 of Moran et al., filed on Sep. 19, 2008, now U.S. Pat. No. 7,793,548 which is a divisional of U.S application Ser. No. 10/359,489, of Moran et al., now U.S. Patent No. 7,433,712, filed on Feb. 6, 2003.

FIELD OF THE INVENTION

The present invention is related to the field of non-volatile solid state memory devices, for example flash memory devices.

BACKGROUND

Mobile non-volatile solid state storage is available as a Disk-on-Keys™ system marketed by M-systems Inc. In this system, a small key fob with a USB connector includes a flash memory module and a controller which communicates over the USB connector with a host computer. The controller emulates a disk drive to the host system.

Many electronic devices use flash memory modules for non-volatile storage of data or code.

While many electronic devices store data (e.g., cellular telephones, organizers, palm computers), interfacing with a host computer typically requires special protocols and user interfaces.

There exist digital cameras that can be connected to a USB port on a host computer and images stored in their memory can be viewed on the host computer.

Some devices, while mobile, cannot be used at all times. For example, airlines prohibit the use of cellular telephones on airplanes, which blocks access to information stored on a cellular telephone, while the airline is in flight.

SUMMARY OF THE INVENTION

A broad aspect of some embodiments of the invention relates to packaging a flash memory storage system having its own directly accessible external interface, within the housing of a cellular telephone, so that an external device can directly access the storage system, as a storage system, using that connection. In an exemplary embodiment of the invention, the external interface allows a separate access directly to said storage system, as a storage system and not via a CPU of said telephone or another intermediary device. In an exemplary embodiment of the invention, the storage system is functionally integrated with the telephone. Alternatively or additionally, the storage system shares one or more hardware components with the telephone. It should be noted that even merely sharing a housing or other enclosure between a cellular telephone and a storage system may provide substantial benefits, for example, reducing weight, reducing clutter, preventing the storage system from being misplaced and/or reducing cost.

In an exemplary embodiment of the invention, the telephone provides added functionality to the storage system. For example, the telephone display and input may be used for managing the storage system. Alternatively or additionally, the telephone has access to and uses the storage system, for example, storing data on the storage system (which is also accessible from outside the device) or transmitting or processing data stored on the storage system. Alternatively or additionally, the functionality of the telephone and storage system is at least partly integrated, for example, preventing the telephone from operating when the system is in use and/or preventing access of the telephone to the storage system when the storage system is otherwise occupied (e.g., connected to an external host). Alternatively or additionally, the storage system is used to support non-storage activities of the telephone, for example using its connector for telephone-related activities, for example printing.

In an exemplary embodiment of the invention, the directly accessible interface is a cable connection, such as using a USB connector. Alternatively or additionally, the interface is a sort range wireless connection, such as using IR or using a BlueTooth or other RF connection, such as IEEE 802.11.

Optionally, the software interface between a host computer and the telephone is stored on the telephone, possibly excepting a boot-strapping portion (e.g., a USB mass storage class driver and a USB stack) stored on the host computer.

In an exemplary embodiment of the invention, a random access block device interface (e.g., of a hard-disk) is used for attaching the telephone to a host computer. In an exemplary embodiment of the invention, this interface is used for accessing storage on the storage system alternatively or additionally to being used for interaction with the telephone. In one example, mail is transmitted using the cellular telephone by copying it from a host computer into a special file on the storage system. In some embodiments of the invention, the telephone accesses the storage system using a different protocol from the host computer.

In an exemplary embodiment of the invention, the storage system is functionally presented to the host as a stand-alone storage system, such as a Disk-On-Key™ system.

In an exemplary embodiment of the invention, separate controllers are provided for the storage system and the telephone. This might be useful, for example, to allow separate powering of the storage system when the telephone is powered off. Alternatively or additionally, the telephone controller provides at least some functionality for the storage system, for example controlling access and/or providing additional functionality, such as encryption.

An aspect of some embodiments of the invention relates to a partitioned flash memory storage system that is integrated with a telephone. In an exemplary embodiment of the invention, the partitioning, in software and/or hardware prevents deletion, writing and/or reading in at least part of the memory, from outside of the telephone. Alternatively or additionally, this partition is invisible from outside the telephone. For example, an operating system of the telephone may be stored in a shared memory system and be partitioned so that direct access to the storage system, not through the telephone, cannot be used to modify the operating system by a user. Optionally, the operating system (or other important code and/or data) is also protected from erasure, optionally by a method other than partitioning or the access to it is enabled only by password.

In an exemplary embodiment of the invention, the flash memory is partitioned into several parts, two or more of: a partition private to the storage system, from external access, a partition private to the telephone, and a partition with hidden data, for example code for operating the flash memory system and/or the telephone.

An aspect of some embodiments of the invention relates to a dual mode flash memory controller on a single integrated circuit which can be controlled and/or powered in two or more different ways. In an exemplary embodiment of the invention, the memory controller includes circuitry for receiving power from a USB connection and from a power line. Alternatively or additionally, the flash memory controller includes circuitry for receiving commands and data over a USB connection and circuitry for receiving commands and data over a second bus, for example, a second USB connection, an SRAM interface and/or a parallel interface.

In an exemplary embodiment of the invention, a single integrated circuit package is provided which includes both a complete hard disk emulation, optionally bootable and an interface for USB connection, for example with a flash memory array included on a same integrated circuit as the controller.

In an exemplary embodiment of the invention, the flash memory controller selects which interface to receive commands from, based on which interface is connected. Alternatively or additionally, the interface is selected based on software commands. Optionally, both interfaces can be active at a same time, with the controller providing sector locking or another mechanism to prevent clashes between the commands.

In an exemplary embodiment of the invention, a hard disk emulation package is provided with an internal USB connection for connecting to a parent computer. An external USB connection is optionally provided for connection to a host computer (e.g., with a standard USB connection). In an exemplary embodiment of the invention, only one set of USB interface circuitry is provided, with a switching circuit being provided and used to decide which lines are used for the connection. Optionally, an SRAM interface is provided to support booting from the hard-disk emulation package, with a USB connection being used for normal data transfer after booting.

In an exemplary embodiment of the invention, a two port flash memory system is used for embedded devices, such as set-top boxes or telephones, to allow programming and/or reprogramming of the device by updating of the flash memory after manufacture.

An aspect of some embodiments of the invention relates to using a telephone as a single or main source of personal data and files and to apparatus and/or methods which support such use. In an exemplary embodiment of the invention, a storage system is programmed to include various personal setting files used by a host computer for various applications, such as calendar and contacts applications. In an exemplary embodiment of the invention, the telephone is similarly programmed to use the self-same files for a same use. Thus, synchronization is not required. In an exemplary embodiment of the invention, this functionality is enabled by providing a periodic and optionally transparent synchronization between the telephone and one or more files on the storage system. Alternatively or additionally, this functionality is enabled by providing one or two protocol interfaces in association with the storage system, which protocol interfaces convert between the file formats used by the telephone and/or one or more host computers and a standard which is used by the storage system.

There is thus provided in accordance with an exemplary embodiment of the invention, a mobile telephone device, comprising:

an enclosure;

a plurality of hardware components that provide the functionality of a cellular telephone or a satellite telephone, at least some of said components being inside or on said enclosure;

a solid state non-volatile storage system inside of said enclosure; and a directly accessible connection for said storage system, adapted to connect to an external host system. Optionally, said connection is a physical connected to said storage system. Alternatively or additionally, said storage system is separately accessible from said telephone via said connector.

In an exemplary embodiment of the invention, said connection comprises a USB connector. Alternatively, said connection comprises a wireless-interface.

In an exemplary embodiment of the invention, said non-volatile memory comprises flash memory.

In an exemplary embodiment of the invention, said storage system shares at least one hardware component with said telephone. Optionally, said storage system shares at least one a flash memory module for storing data with said telephone. Alternatively or additionally, said at least one component comprises a flash memory controller. Alternatively or additionally, said at least one component comprises a controller. Alternatively or additionally, said at least one component comprises a user interface element. Alternatively or additionally, said at least one component comprises a power source. Alternatively or additionally, said flash memory storage system shares a connector with said telephone.

In an exemplary embodiment of the invention, said storage system is functionally integrated with said telephone. Optionally, at least one user interface component of said telephone is used to manage said storage system. Alternatively or additionally, operation of one of the telephone and storage system affects an operation of the other. Optionally, attachment of said storage system to a host, limits access of said telephone to said storage system. Alternatively or additionally, attachment of said storage system to a host, powers off said telephone.

In an exemplary embodiment of the invention, at least one file in said storage system is configured to act as a mail file for transmission of mail on said telephone. Alternatively, at least one file in said storage system is configured to act as a personal setting file for operation of said telephone.

In an exemplary embodiment of the invention, said connection is adapted to present said storage system as a hard disk system to said host.

In an exemplary embodiment of the invention, said connection is adapted to present said storage system as a stand alone storage system to said host.

In an exemplary embodiment of the invention, said connection is adapted to present said storage system as a transfer system to said host.

In an exemplary embodiment of the invention, said connection comprises a connector mounted on a retractable setting. Optionally, said setting comprises a cable with a connector at one end.

In an exemplary embodiment of the invention, said storage system comprises a removable flash memory module.

In an exemplary embodiment of the invention, said storage system comprises only permanently attached flash memory modules.

In an exemplary embodiment of the invention, said storage system is adapted to be powered by said connection and separately from said telephone.

In an exemplary embodiment of the invention, only some of a storage space of said storage system is accessible by said telephone. Alternatively or additionally, only some of a storage space of said storage system is accessible by said host.

In an exemplary embodiment of the invention, said storage system is selectively powered by said telephone and via said connector. Alternatively or additionally, said storage system is adapted to be selectively controlled by said host and by said telephone. Optionally, said storage system is controlled by a single flash memory controller.

In an exemplary embodiment of the invention, said storage system is controllable by at least two flash memory controllers.

In an exemplary embodiment of the invention, said telephone comprises a flash memory module inaccessible by said storage system.

There is also provide in accordance with an exemplary embodiment of the invention, a method of accessing files stored on a telephone, comprising:

attaching the telephone to a host computer using a connection of said telephone; and automatically recognizing said telephone as a hard-disk-like device by said host computer. In an exemplary embodiment of the invention, the method comprises accessing one or more files on said hard disk device by said host. Optionally, said connection comprises a USB connector. Alternatively, said connection comprises a local wireless connection.

In an exemplary embodiment of the invention, accessing comprises manually initiating the copying of files. Alternatively or additionally, accessing comprises automatically initiating the copying of files.

In an exemplary embodiment of the invention, said one or more accessed files is a personal settings file used for personalization of an application on said host. Optionally, said personal settings file is used for personalization of an application on said telephone.

In an exemplary embodiment of the invention, the method comprises automatically changing access privileges to at least part of a storage area on said telephone responsive to said attachment.

In an exemplary embodiment of the invention, accessing comprises marking for processing. Optionally, said processing comprises deletion. Alternatively or additionally, said processing comprises transmission.

In an exemplary embodiment of the invention, the method comprises:

transferring one or more instructions or files to said telephone from said host. Optionally, the method comprises transferring one or more files from said host to said telephone. Alternatively or additionally, the method comprises transferring one or more instructions from said host to said telephone. Optionally, the method comprises:

automatically carrying out said one or more instructions after a disconnection of said telephone from said host.

There is also provided in accordance with an exemplary embodiment of the invention, a method of sending e-mail from a computer, comprising:

attaching a telephone to a computer;

saving at least one e-mail message from said host on said telephone;

activating said telephone; and automatically sending said e-mail message after said activating. Optionally, said saving is transparent to a user of said computer, as compared to a regular e-mail transmission process.

In an exemplary embodiment of the invention, said activating comprises detaching said telephone. Optionally, sending is carried out at a delay after said detaching.

In an exemplary embodiment of the invention, said activating comprises turning on an RF sub-system of said telephone.

In an exemplary embodiment of the invention, said activating comprises entering a coverage area of a base station for said telephone.

In an exemplary embodiment of the invention, said telephone includes a hard-disk emulator on which a mailbox file accessed by an e-mail application of said host, is stored.

In an exemplary embodiment of the invention, said telephone emulates an e-mail server to said host.

In an exemplary embodiment of the invention, an RF circuit of said telephone is powered off during said saving.

There is also provided in accordance with an exemplary embodiment of the invention, a method of consolidating message journaling, comprising:

receiving a first message on a telephone;

storing the first message on the telephone;

receiving a second message on a host; and storing the second message from the host on said telephone indexed with said first message. Optionally, said host receives the message using a personal setting file stored on said telephone.

There is also provided in accordance with an exemplary embodiment of the invention, a dual access non-volatile memory circuit, comprising:

at least one non-volatile memory module;

at least one interface circuit attached to a first bus, for said memory module;

at least one power line; and at least one additional interface circuit attached to a second bus or power line. Optionally, said circuit comprises at least two power lines. Optionally, said circuit comprises at least two interface circuits. Optionally, the interface circuits are of different types. Alternatively, the interface circuits are of a same type. Optionally, the interface circuits comprise a switch and a shared circuit for two sets of interface connection lines.

In an exemplary embodiment of the invention, said circuit comprises a switch for automatically switching between power lines.

In an exemplary embodiment of the invention, a different power line is used depending on which interface is active. Alternatively or additionally, both interfaces are active at a same time. Alternatively, both interfaces cannot be active at a same time.

In an exemplary embodiment of the invention, said circuit comprises at least three interfaces.

In an exemplary embodiment of the invention, said interfaces comprise a USB interface and a bootable interface.

In an exemplary embodiment of the invention, said interfaces comprise at least two USB interfaces.

In an exemplary embodiment of the invention, said non-volatile memory is partitioned between said two interfaces, so that at least some of said memory is not accessible by both interfaces.

There is also provided in accordance with an exemplary embodiment of the invention, a flash memory storage system, comprising:

an enclosure;

a flash storage module provided in said enclosure; and a connector retractable into said enclosure. Optionally, said cable is mounted on a retractable cable. Alternatively or additionally, said enclosure encloses a telephone.

BRIEF DESCRIPTION OF THE FIGURES

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements or parts which appear in more than one figure are preferably labeled with a same or similar number in all the figures in which they appear, in which.

DETAILED DESCRIPTION OF EXEMPLARY EMBODIMENTS

Overview

Figure 1:
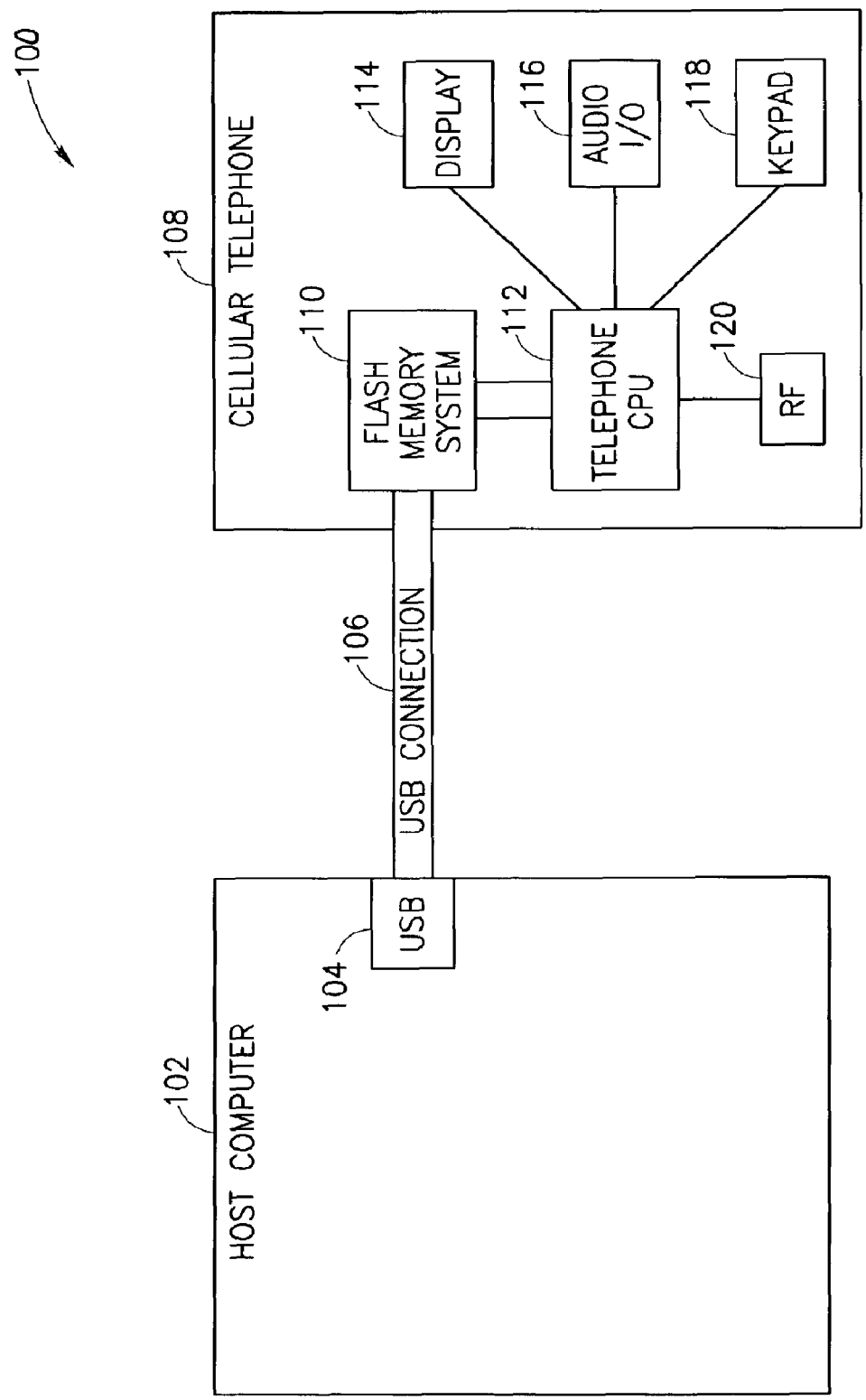
FIG. 1 is a schematic illustration of a connection configuration of a flash memory system integrated into a telephone, in accordance with an exemplary embodiment of the invention.

FIG. 1 is a schematic illustration of a connection configuration 100 of a flash memory system 110 integrated into a cellular telephone 108, in accordance with an exemplary embodiment of the invention. One particular feature of cellular telephones which is useful for some embodiments of the invention is that a cellular telephone is a highly mobile and typically hand-held communication device capable of transmitting voice and data.

As shown, a flash memory system 110 is incorporated in a housing of cellular telephone 108. A USB connection 106 is used to connect flash memory system 110 to a host computer 102, via a USB port 104 thereof. Alternatively, other connection methods are used. Optionally, the connection uses a mass-storage device protocol, which can, for example, allow flash memory system 110 to appear as a hard disk to host computer 102. Other protocols can be used as well, for example as described below. Optionally, a protocol that is standard with a standard operating system is used.

While various types of integration of flash memory system 110 into telephone 108 are envisioned, in exemplary embodiments of the invention, flash memory system 110 is at least partially accessible by a CPU 112 of telephone 108. Optionally, this access allows coupling between flash memory system 110 and various sub-systems of telephone 108, for example, one or more of a display 114, an audio input and/or output 116, a keypad 118, an RF subsystem and/or other subsystems of telephone 108.

Other hardware components may be shared between flash memory system 110 and telephone 108, for example, a battery, a CPU and/or a clock. In any case it should be noted that in some applications even sharing only the housing allows a significant reduction in total volume and weight and reduction of a number of items which might get misplaced (e.g., the smaller they are, the more likely to be misplaced).

Connection

Figure 2A:
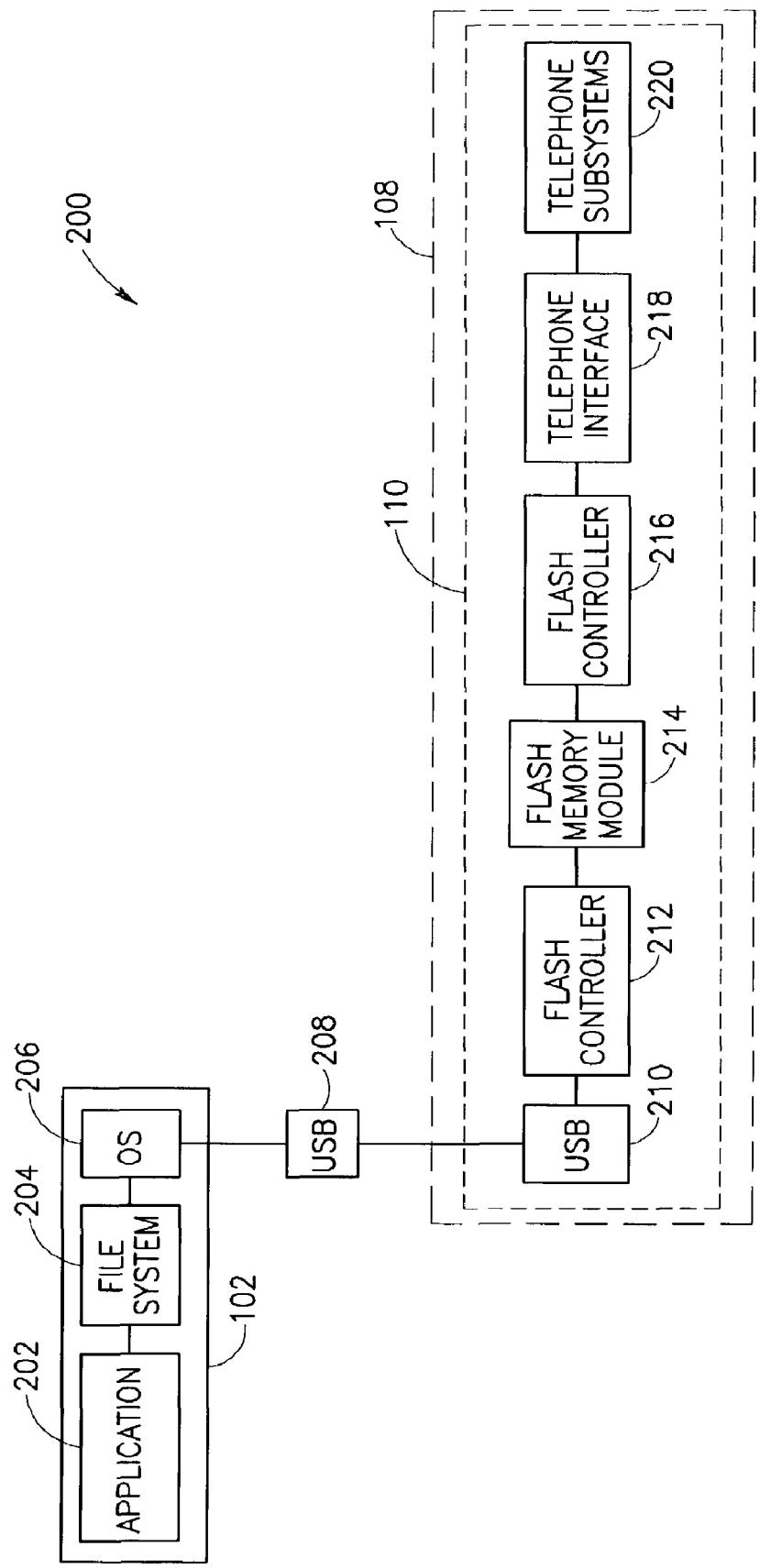
FIG. 2A is a functional block diagram of a flash memory system integrated into a telephone, and a host system, in accordance with an exemplary embodiment of the invention.

FIG. 2A is a functional block diagram 200 of flash memory system 110 integrated into telephone 108 and host system 102, in accordance with an exemplary embodiment of the invention. Other variations are described below. Host system 102 is, for example, a computer, which, recognizes flash memory system 110 as a hard disk, for which a driver is included in the operating system. This is not essential, however, and other interfaces, possibly requiring a non-standard driver, may be provided. In one example, an IR (infra-red) driver is installed on host 102 that recognizes the telephone and treats storage system 110 as a hard disk.

Alternatively or additionally, once flash memory system 110 is recognized, host system 102 may execute (e.g., manually or automatically) a program stored on the flash memory system to change the connection protocol.

Host 102 executes an application 202 which accesses flash memory system 110 via a file system 204 of host 102. In an example of a USB connection, an operating system 206 converts file system functions into USB commands (e.g., according to a USB mass-storage specification), which are transmitted over a USB connection (physical and logical) 208 to a slave USB connection 210 in telephone 108. Other access methods may be used as well, as known in the art of USB device access by a host.

In telephone 108, the USB commands are transmitted to a flash controller 212 which controls one or more flash memory modules 214 according to the commands. The modules may contain various amounts of memory, for example, 8 MB, 16 MB, 32 MB, 128 MB, 512 MB, 1024 MB or more. Various implementation may be used, for example the one used in the above mentioned Disk-On-Key™ flash memory product. Optionally, a dedicated telephone interface 218 is provided for one or more telephone sub-systems 220 to interface with flash memory module(s) 214, via controller 212 and/or via a separate, optional, controller 216. Various such configurations are described below.

Figure 2B:
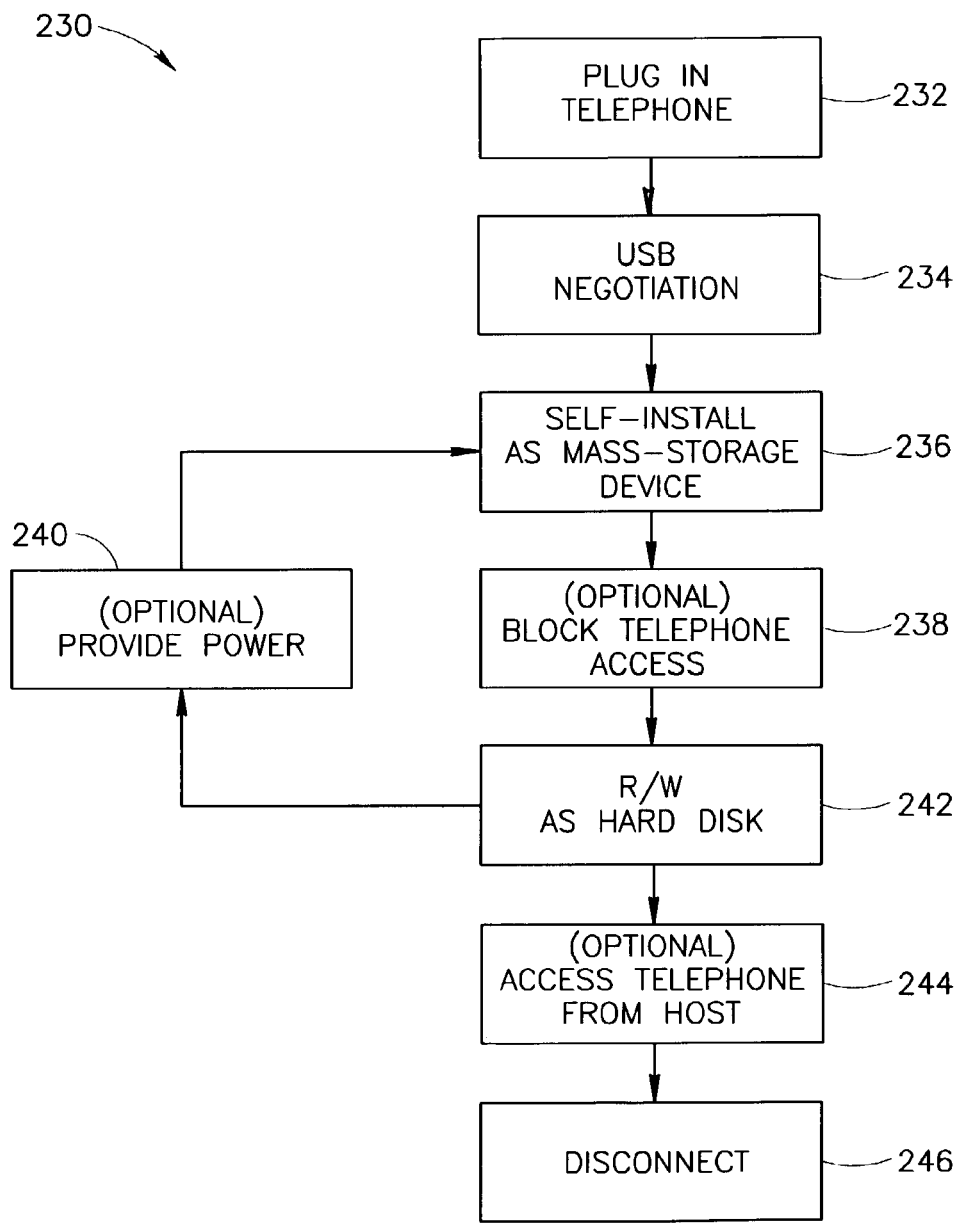
FIG. 2B is a flowchart of a process of recognition of a flash memory system when attached to a host computer, in accordance with an exemplary embodiment of the invention.

FIG. 2B is a flowchart 230 of a process of recognition of a flash memory system when attached to a host computer, in accordance with an exemplary embodiment of the invention. At 232, telephone 108 is plugged into a USB port of host 102. Alternatively to using a USB connection, other connection methods, such as BlueTooth, Firewire and a RS232 connection may be used. Optionally, a self-configuring connection method, such as provided by the USB protocol, is desired, to simplify the interface for users.

At 234, USB negotiation and enumeration proceeds automatically, as well known in the USB specification. Optionally, some user control is provided, for example, telephone 108 may include the option of activating or deactivating the USB interface via the telephone interface.

At 236, host 102 installs flash memory system 110, for example as a USB mass storage device (e.g., as a removable hard-disk). As this depends on the way in which flash memory system 110 identifies itself, it is possible to vary the device the memory is identified as. For example, flash memory system 110 can present itself to the host computer as two or more mass-storage devices or as a mass-storage device and a modem (e.g., for accessing some of the telephone functionality). Optionally, the telephone interface is used to select how flash storage system 110 will present itself. Optionally, a standard driver for a combined telephone/flash storage system is provided with at least some operating systems, or is installed by a user, for example, by first connection the telephone as a mass-storage device and then installing a suitable driver from flash memory system 110. Optionally, host 102 executes a special driver or interface program that recognizes when a telephone/flash storage system is connected and acts accordingly. Alternatively, telephone 108 is presented as a network computer, for example using a USB network, with the flash storage system optionally being an exported network drive. In some embodiments as described below, non-standard functionalities are provided by treating certain files on flash memory system 110 as having a special meaning, for example for transmitting mail.

At 238, the operational mode of telephone 108 is optionally changed (e.g., when the telephone is connected to the computer), for example, causing the telephone to act as a modem for the computer or to prevent access from the telephone to the flash memory system, or at least a part thereof.

At 240, power is optionally provided via the USB connector. This power may be used, for example, for flash controller 212, for flash memory modules 214 and/or optionally for one or more of telephone sub-systems 220 (e.g., if the telephone is off), but typically not the RF subsystems.

Optionally, once the connection is established, telephone 108 provides feedback on the connection, for example, via its display or as an auditory (speech or otherwise) message.

At 242, flash memory system 110 is optionally accessed for reading and/or writing, from host 102, as a hard disk. In some embodiments, a read-only access may be useful. Alternatively or additionally, the USB connection may be used to access telephone 108 from host 102 (or vice versa) (244). In one example, a telephone configuration-or software update program is executed on host 102. Once the files are ready, they are exported in read form to the telephone via the flash storage system, for example into a particular location thereon. Optionally, telephone 108 exposes its internal settings by posing as a set of hypertext files or a WWW server. In another example, telephone 108 is treated as a modem for host 102. In another example, telephone 108 uses host 102 for various functions such as backup, printing or using a host's Internet connection which is generally cheaper, rather than its own. Optionally, when telephone 108 recognizes that it is connected to host 102, it executes various scripts and/or programs, for example for periodic backup. Optionally telephone 108 recognizes which computer it is connected to, for example using an application or driver that is activated automatically by the host when it recognizes that a USB device is attached.

At 246, telephone 108 is disconnected. Optionally, proper disconnection requires a user to indicate impending disconnection to host 102 and/or telephone 108 (e.g., via the telephone or host interface).

Exemplary Usage

Figure 3:
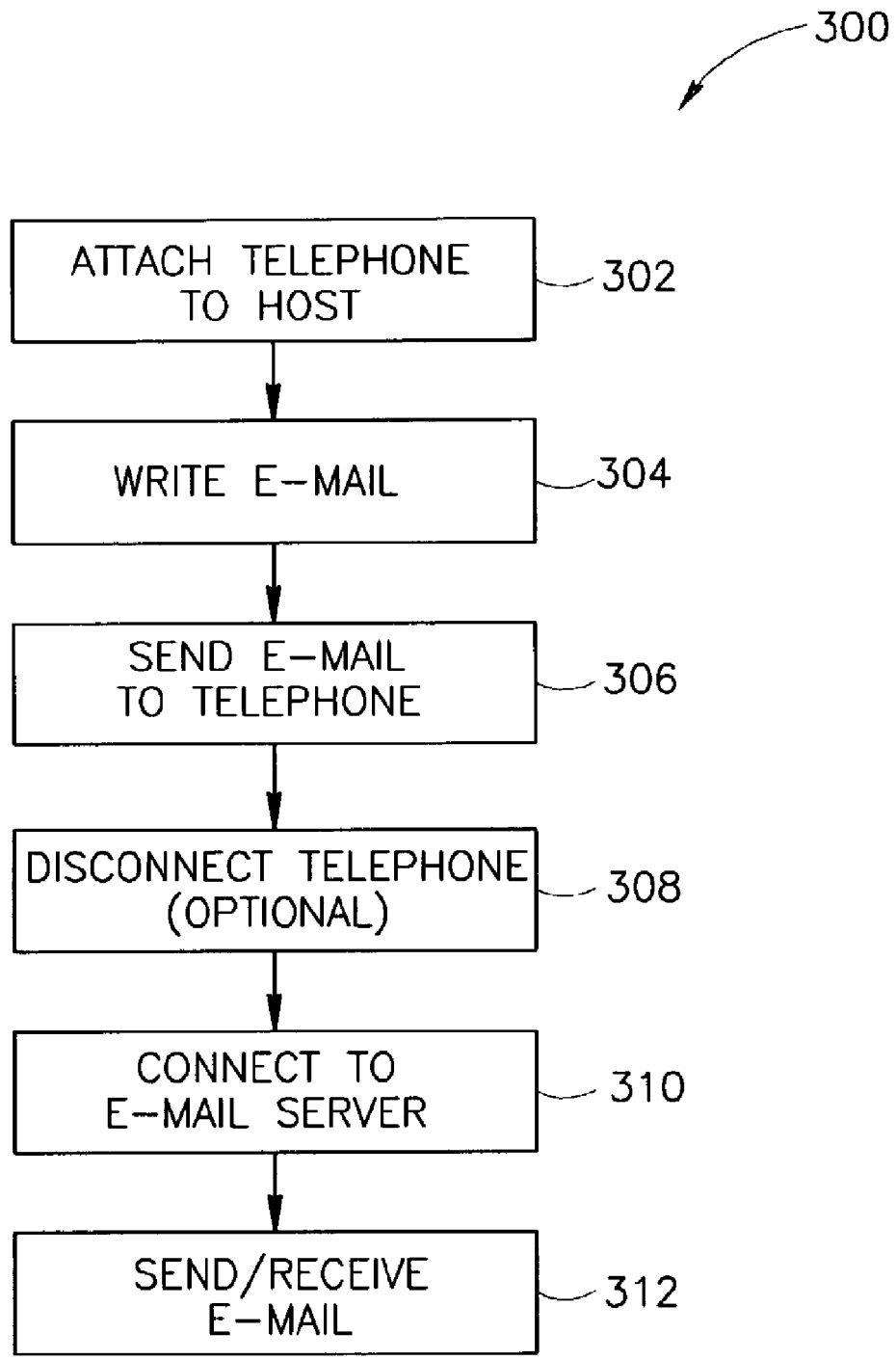
FIG. 3 is a flowchart of a method of sending mail using a telephone-integrated flash memory system, in accordance with an exemplary embodiment of the invention.

FIG. 3 is a flowchart 300 of a method of sending mail using a telephone-integrated flash memory system 110, in accordance with an exemplary embodiment of the invention.

At 302, telephone 108 is attached to a host 102. In an exemplary embodiment of the invention, this process is carried out on an airplane and telephone 108 (e.g., at least its RF subsystems) is off (or is automatically turned off by the attachment), as currently required by many airlines.

At 304, an e-mail is written on the computer. Possibly this is performed before 302.

At 306 the e-mail is sent to the telephone. Various methods may be used. In one examples the e-mail folders (or at least the outgoing e-mail folder) are stored on telephone 108 (e.g., in storage system 110), so the act of saving the e-mail and indicating it for transmission performs this sending. In another example, the e-mail is copied to a special file or folder on flash file system 110. In another example, telephone 108 emulates an e-mail server, for example by execution of a suitable driver program after attachment of telephone 108 to host 102.

It should be noted that in some embodiments of the invention the user is not required to perform any additional steps beyond what is normally done when transmitting e-mail. Optionally a message that the e-mail will be sent by telephone is provided. Alternatively, the user selects to send the message by telephone.

In an exemplary embodiment of the invention, software for host 102 is uploaded from telephone 108, to assist in performing one or more of the above functions (e.g., redirection of e-mail by installing suitable modules into an e-mail program). Optionally, this software self-terminates when the telephone is disconnected.

At 308, telephone 108 is optionally disconnected from host 102. This may turn on telephone 108 if it was earlier automatically turned off by the connection, for example if suitable hardware and/or software is provided in telephone 108. Alternatively, a user manually turns on the telephone, for example after he lands or reaches a locale where cellular communication is less expensive (e.g., as compared to user defined settings).

At 310, telephone 108 connects to an e-mail server, for example using its wireless connection or when the telephone is connected to a suitably networked computer.

At 312, telephone 108 transmits the e-mail, for example by e-mail server or using a dedicated cellular function (e.g., SMS messaging). In an exemplary embodiment of the invention, an internal e-mail program in telephone 108, accesses the mailbox stored on flash memory system 110 and sends the e-mail. Optionally, telephone 108 also downloads e-mails at this time, for later transfer to a host 102 and/or for storage in a local mailbox file.

Alternatively or additionally to providing just e-mails (e.g., possibly with attachments from host 102), a user may specify files to attach from flash memory system 110. Alternatively or additionally, a user may access a mail file of telephone 108 to set up later transmissions of files by telephone 108.

Alternatively or additionally to e-mail, other instructions may be provided via host 102 for later execution by telephone 108, for example, instructions to send text or picture SMS messages or instructions to show (e.g., sound or visual) the files at a predetermined time or sequence.

In some telephones, instructions to be performed when the telephone is connected to a network or computer, may be entered into the telephone when it is not transmitting, without an intermediate of a host computer. In some embodiments of the invention, when the RF subsystems of the telephone are powered off the telephone interface operates for storage system 110.

In an exemplary embodiment of the invention, e-mail is sent directly to another telephone 108. In one example, telephone 108 is adapted to act as an e-mail client which downloads e-mail for later optional retrieval by a host computer. Optionally, this functionality is used for transmitting files directly between telephones 108 having storage systems. Optionally a special e-mail address is provided for such telephones by the cellular network so that they can be recognized by other such telephones. Alternatively or additionally, two telephones may negotiate, for example using SMS messages, to determine the sending, receiving, storage and/or processing capabilities of the telephones. For example, a first telephone will not send a large image to a second telephone with insufficient memory to store the image. Instead, only a notice will be sent for later download of the whole image when the telephone is connected to a host computer with sufficient memory.

In an exemplary embodiment of the invention, the following methodology is used. A user manipulates his telephone to select a file to send to another telephone. When prompted the user may enter an e-mail address or a telephone number. Actual transmission may be carried out, for example using the cellular telephone network functions of data transmission, using an Internet gateway and/or using standard e-mail.

In an exemplary embodiment of the invention, when a file is transferred using this method, the file is directly installed in a suitable location in the storage system of the target system. Optionally, this location is not an operative location of the telephone (e.g., music directory). Rather, it is a file system location which a user can then access for upload to a host system. For example, the file may be transferred to a location that mirrors its origin. Alternatively, the file may be transferred to a location associated with its function, for example a media directory for a media file.

Figure 4:
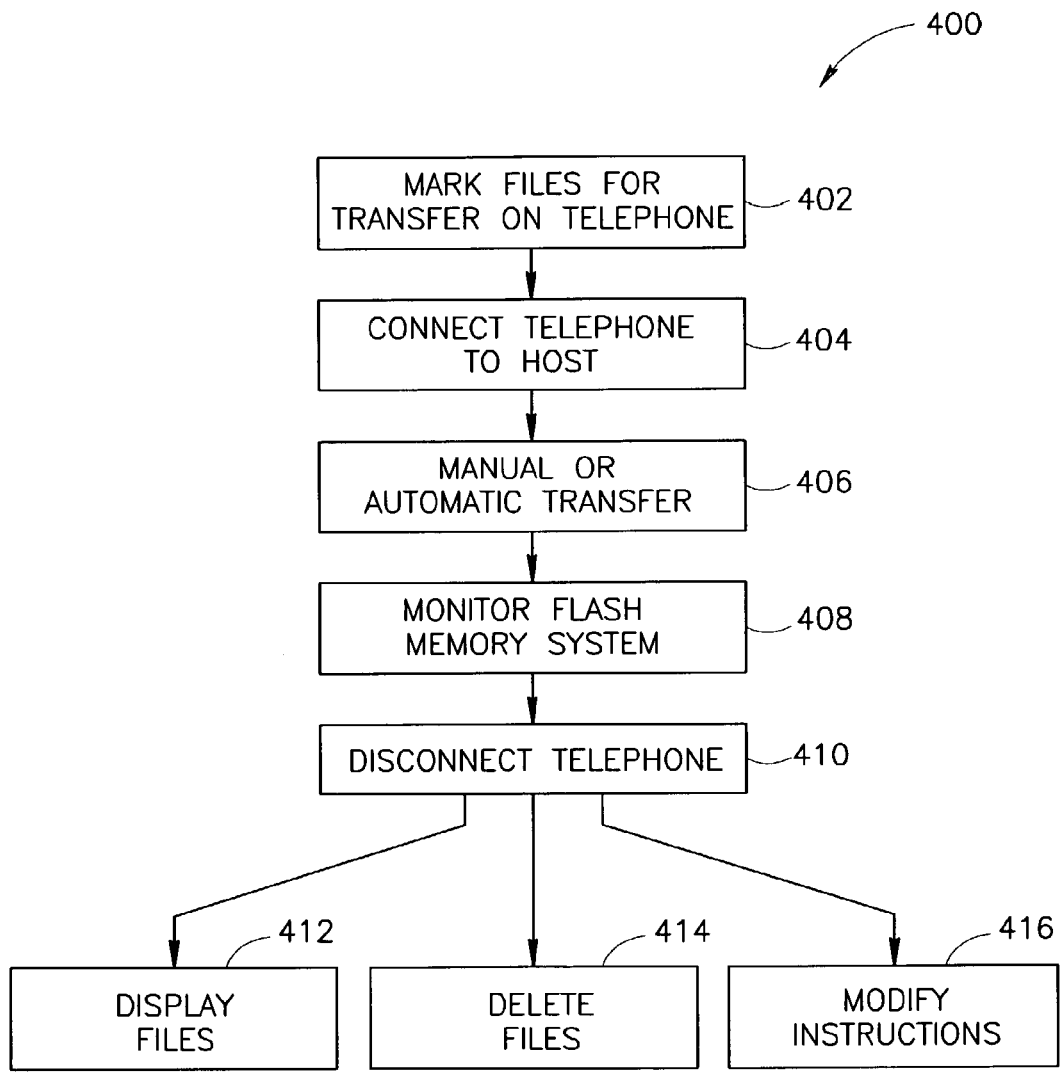
FIG. 4 is a flowchart of a method of managing a flash storage system using an integrated telephone interface, in accordance with an exemplary embodiment of the invention.

FIG. 4 is a flowchart 400 of a method of managing flash storage system 110 using an interface of telephone 108, in accordance with an exemplary embodiment of the invention. The acts shown can be performed in various orders and, being an exemplary flowchart, not all acts are needed in all embodiments.

At 402, while telephone 108 is optionally not connected to host 102, a user can optionally use the display and keypad (and/or voice and/or other user interface) of telephone 108 to mark files for transfer to a host computer, for example host 102 or a different host that is physically connected (e.g., also using a short range wireless connection, such as BlueTooth) or a host computer to which a wireless connection will be made using the cellular telephone functionality. For example, such files can include downloaded e-mails, files previously transferred from a computer, journaled files (e.g., acquired images on a telephone with a camera or scanner). Alternatively or additionally, a user can indicate parts of flash storage system 110 (and/or telephone memory 108) to be backed up. Such indication can be also preset, for example indicating a periodic backup for certain files. Alternatively or additionally to backing-up, synchronization may be selected, in which the files on the host and/or on the telephone are synchronized to include updated information form each other, for example calendar information. At this point, in some embodiments of the invention, the telephone has not sent any messages or performed any act. However, the acts to be performed when it is connected to a network or host are programmed.

At 404, telephone 108 is attached to host 102, for example using a USB connection.

At 406 transmission to host 102 is performed, for example manual- or automatic-triggered. In an embodiment of the invention, transfer is initiated by executing a program stored on flash memory system 110. Alternatively or additionally, files to be transferred are stored in a special location on flash memory system 110. In an exemplary embodiment of the invention, transfer is initiated using the interface of host 102. Alternatively or additionally, the transfer is initiated using the interface of telephone 108. Alternatively or additionally, the transfer is initiated by a driver on host 102 that is loaded when telephone 108 is attached to host 102. Optionally, a briefcase-like mechanism as provided in some Microsoft Windows operating systems, is used for file synchronization.

Optionally, telephone 108 is used (408) to control and/or monitor the transfer of files and/or from flash memory system 110. In one example, a display of telephone 108 (visual or audio) generates indications when a file is copied to or from flash memory system 110. Alternatively or additionally, an indication is generated when a file is modified. Alternatively or additionally, an indication is generated when the flash memory system is filling up or is full. Optionally, one or more meters are displayed continuously on telephone 108, for example, amount of free space or number of files.

In an exemplary embodiment of the invention, when one or more files, partitions or the whole flash memory system is encrypted, the telephone interface may be used for entering a decryption password, for example by typing a code or as biometrics information, such that host 102 cannot access the password in any way. Optionally, this authorization request (e.g., even a simple "OK") is applied the first time a file is accessed from a host computer or when the host tries to delete a file, even if no encryption is provided, for example to all files or only to particular "protected" files.

Alternatively or additionally to regular file transfer, telephone 108 optionally uses the USB connection to instruct host 102, for example instructions to provide a software update, one or more files to be printed by host 102, calendar information to be modified and/or an Internet connection to be made. In an exemplary embodiment of the invention, flash storage system 110 serves as a buffer which can be relatively simply accessed by host 102, for example with part of the flash storage area serving as a print queue and part of the storage area serving as configuration file directories.

At 410, telephone 108 is again disconnected from host 102.

At 412, the interface of telephone 108 is optionally used to display files stored on flash storage system 110.

At 414, the interface is optionally used to delete files or otherwise process files stored on flash storage system 110. Exemplary processing includes marking files for backup, compressing media files and/or play or otherwise view the files.

At 416, the interface is optionally used to modify various processing instructions provided from host 102 to telephone 108. For example, sending instructions (e.g., FIG. 3) may be modified.

Figure 5:
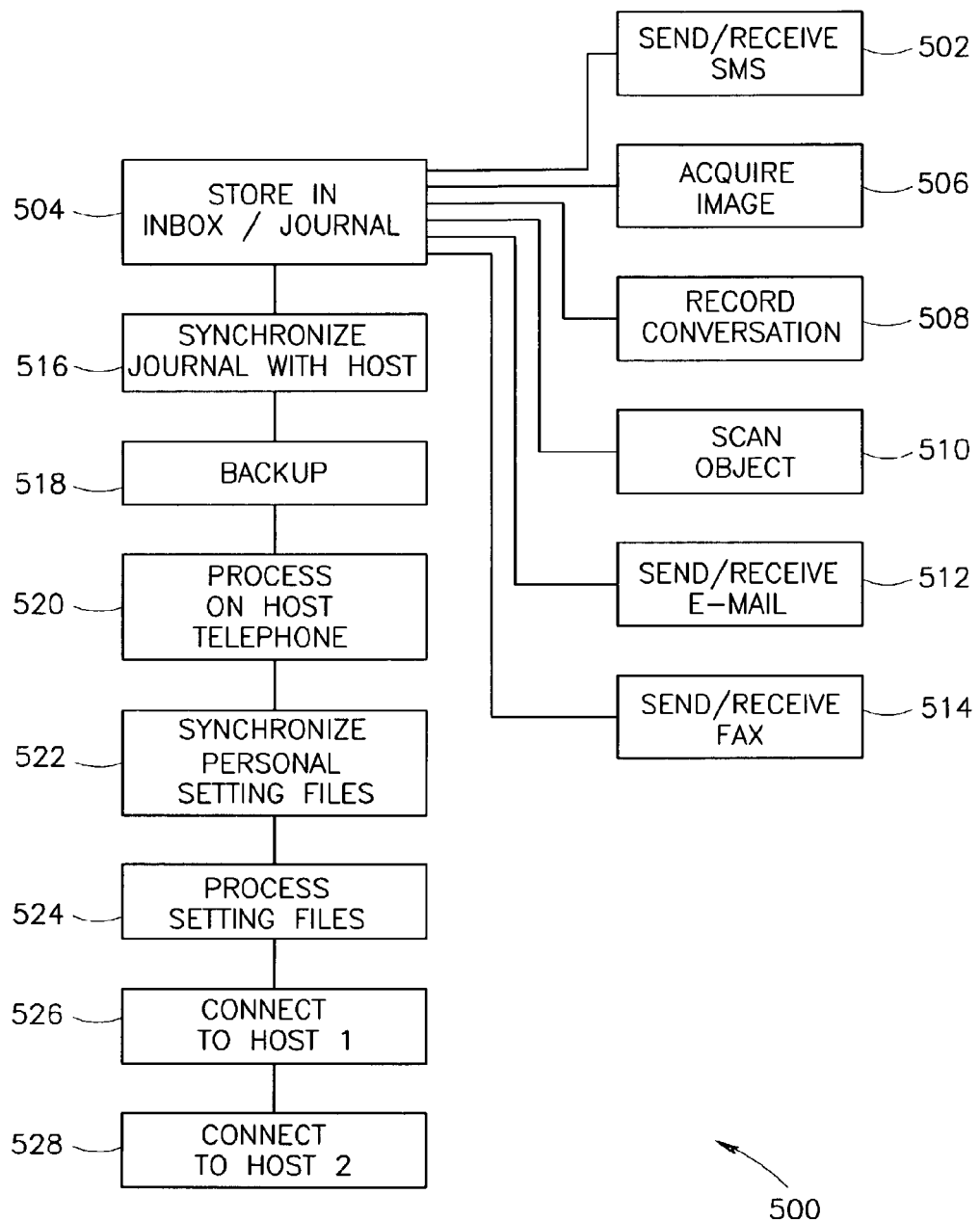
FIG. 5 is a flowchart of a method of using a telephone with an integrated flash memory system to consolidate personal information, in accordance with an exemplary embodiment of the invention.

FIG. 5 is a flowchart 500 of a method of using telephone 108 to consolidate personal information, in accordance with an exemplary embodiment of the invention. It is noted that a significant amount of personal information is generated by- or transfers through- telephone 108. Computer- and/or user-generated files may be stored permanently on flash storage system 110. Optionally, telephone 108 is configured to integrate multiple information sources in a single framework. While FIG. 5 describes one possible implementation, not all the features shown are required in some embodiments of the invention. In this implementation, all acts are carried out on the telephone, unless a host partakes in the act, in which case some of the processing may be carried out on the host.

At 502, an SMS message is sent or received. Boxes 502 and 506-514 illustrate exemplary data generating acts, one or more of which may be supported by telephone 108.

At 504, the message is stored in a mailbox or other journaling system, for example as provided by the Microsoft Outlook version 6 personal information manager software. In an exemplary embodiment of the invention, the storage includes indexing information, for example name of contact or the contents (if it is text rather than an image). This indexing information may be, for example, shared among the various messaging and data modalities described herein.

At 506, an image is acquired, for example using a camera built into telephone 108 or being received by some means. It may similarly be journaled. Such stored images may be displayed using telephone 108 at a user's convenience, for example as known in the art, albeit from storage system 110.

At 508, a conversation is recorded. Missed or unanswered calls can be journaled even if there is no audio to record.

At 510, telephone 108 includes a scanner, which is used to acquire an image of an object, which is then journaled.

At 512, e-mail that is sent or received by the telephone is journaled.

At 514, a fax that is sent or received by the telephone is journaled.

At 516, the journal is optionally synchronized with that of a host computer for example one used to send or receive e-mail, assuming that the mail folders of the host computer are not stored permanently on telephone 108.

At 518, host 102 is optionally used to backup or store part of the journal, for example periodically or in case it gets too large for flash storage system 110.

At 520, the journal is processed and/or stored, for example on host 102 and/or on telephone 108. In an exemplary embodiment of the invention, the journal is used as part of a regular usage of telephone 108 and/or a contact manager function thereof.

At 522, various personal setting files that are stored on flash memory system 110 are synchronized with setting files stored on host 102. In an exemplary embodiment of the invention, however, the setting files are stored only on telephone 108, so no synchronization is required.

At 524, the setting files are processed, for example being used in the normal course of the use of telephone 108, for example for contact management.

At 526, telephone 108 is connected to a first host and the user can then use this host, using his/her personal settings, with his data files (e.g., stored on flash storage system 110) and/or using the journal. Optionally, flash storage system 110 includes a converter that converts (e.g., as a file or as transactions) the form of the setting and/or journal files to one that is recognized by the host. Alternatively or additionally, the flash storage system includes a script that load and/or later unloads the settings from the host computer, for example for such hosts that cannot directly access flash storage system 110 for the setting files. Similarly, telephone 108 may include a converter to convert from the format stored on flash storage system 110 to that which is recognized by the applications of telephone 108.

At 528, this process is repeated when the user migrates to a different host computer.

In an exemplary embodiment of the invention, data files used by the user (e.g., text documents) are also stored or managed (e.g., using a document management software) on telephone 108.

In an exemplary embodiment of the invention, telephone 108 is of a type that also includes an additional functionality, for example that of a personal information manager or hand held computer. Optionally, that additional functionality also has access to some or all of storage system 110 (e.g., as described below in FIG. 7 and independent of telephone 108) and/or may share the setting files and/or other files stored on the storage system with the telephone functionality and/or an external host.

However, in other embodiments of the invention, the non-telephone functionality is limited (e.g., to playing media files, or to communication, such as limited merely to sending and receiving text or media messages) or non-existent, while the abilities of storage system 110 and, optionally, its interaction with telephone 108 as described herein, remain.

Physical Connection

Figure 6:
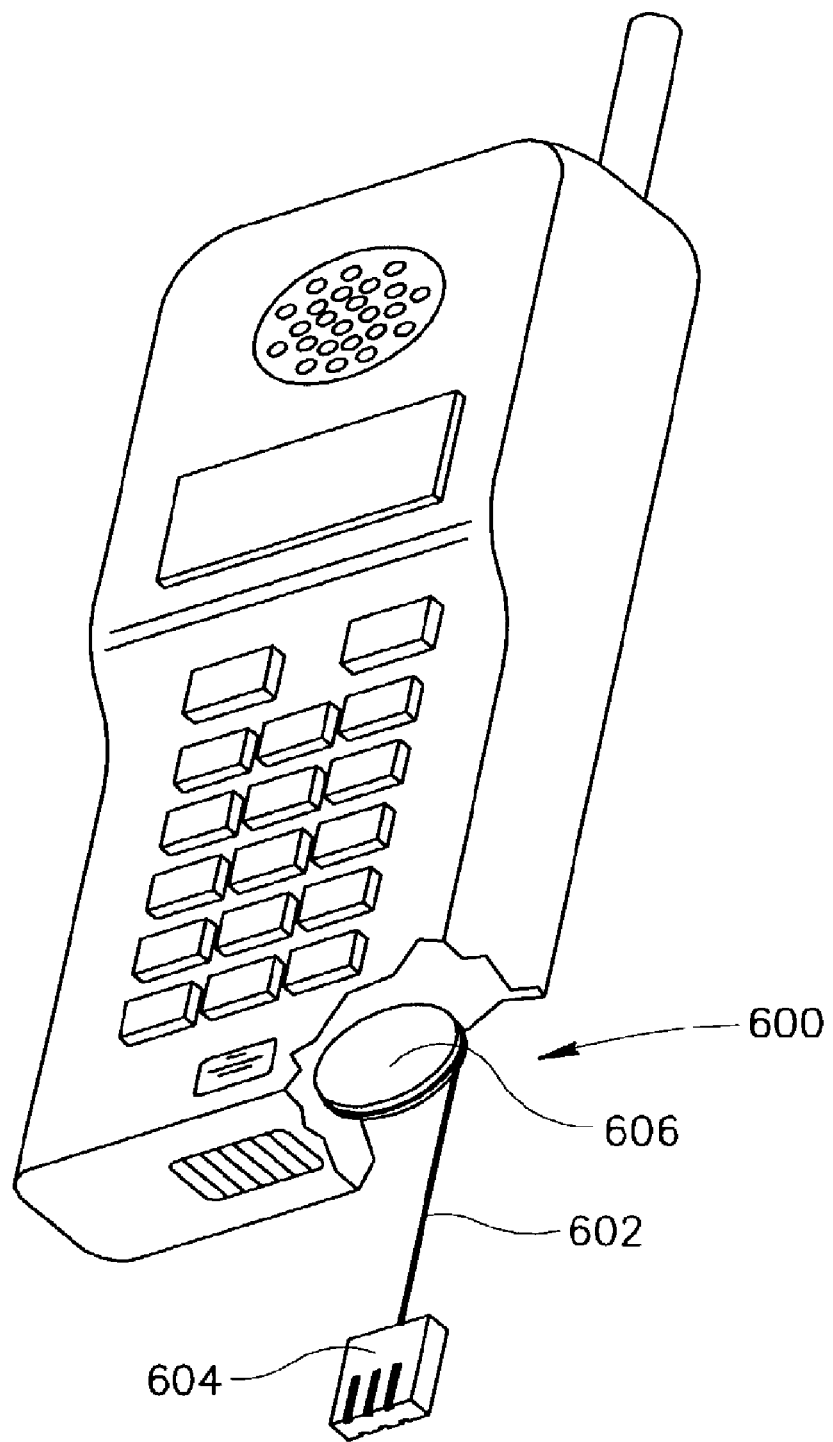
FIG. 6 is a schematic diagram of a cellular telephone including a pull-out USB cable and connector, in accordance with an exemplary embodiment of the invention.

FIG. 6 is a schematic diagram of a cellular telephone 600 including a pull-out USB cable 602 and connector 604, in accordance with an exemplary embodiment of the invention. Optionally, a spring loaded cable retractor 606 is provided to retract cable 602. A small flexible tab (not shown) may be used to pull out connector 604. Other means for pulling out (and/or retracting) retractable cable, as known in the art, may be used instead. Alternatively to retracting cable 602, only connector 604 can be popped in or out. In an alternative embodiment of the invention, a multi-use connector, for example, a female connector or a USB on-the-go connector is provided.

This type of retractable cable/connector may also be provided for other flash memory systems for example dedicated flash storage systems such as the Disk-On-Key™.

One potential advantage of providing a cable is that the display of the telephone can be accessible at a front of a computer, for those computers where the USB connection is at a back part of the computer. Another potential advantage is that the USB connector is not then required to physically support the weight of the telephone, only the weight of part of the cable. Alternatively to providing a cable, only a pop-out USB connector is provided. When not in use, this connector optionally does not mar the profile of the telephone. Alternatively or additionally, a cover for the connector is provided.

It should be noted that in some embodiments of the invention, a local wireless connection is used instead of or in addition to a USB connection, for example an IR or an RF connection.

Partitioning

Figure 7A:
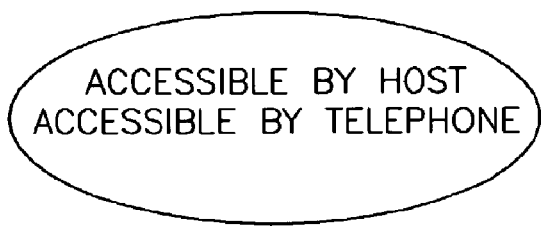
FIGS. 7A-7E are schematic diagrams showing alternative embodiments of partitioning of flash memory in an integrated telephone/flash memory system.

FIGS. 7A-7E are schematic diagrams showing alternative embodiments of partitioning of flash memory in an integrated telephone/flash memory system. FIG. 7A shows a simplest partitioning case, where all of the flash storage is accessible by both the telephone and the host. In this case, if simultaneous access is allowed, file semaphoring may be provided by flash storage system 110, to prevent clashes. A single flash controller may be shared by the telephone and the flash storage system. Optionally, some of the storage space is write (or read) protected or encrypted by software and/or hardware so one or the other of the host and telephone cannot access it (or can only read it). In an exemplary embodiment of the invention, when access to such protected spaces is requested, a user may authorize it by input on the telephone itself.

Figure 7B:
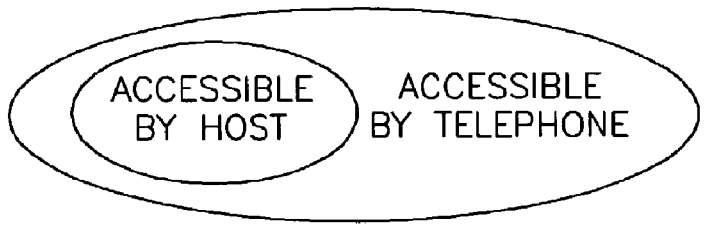

FIG. 7B shows an embodiment where the host can only access some of the flash storage space while all storage space is accessible by the telephone. This is useful, for example, to protect part of the storage area, for example an operating system of the telephone, from accidental or malicious erasure or modification by the host. Possibly, the address space is hidden from the host but the existence can be determined. A single controller may be shared or separate controllers may be provided. It should be noted that in some embodiments of the invention, the partitioning is not fixed and can be changed on the fly, for example via the host or via the telephone, whichever is applicable. Possibly an administrator password will be needed and may be typed into the telephone and/or into a host computer, depending on the application.

Figure 7C:
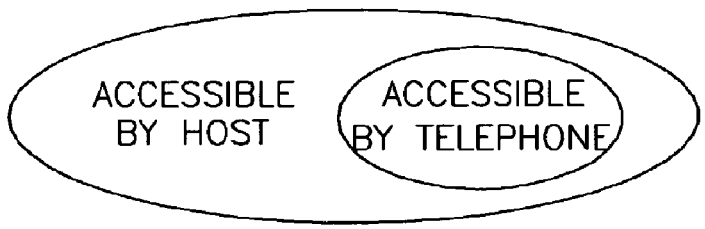

FIG. 7C shows a case where the telephone can only access some of the flash storage area. This may be useful, for example, if the telephone uses a special storage format which is not native on the host. Writing to the telephone area may then be supported by software stored on the host accessible area. This may also prevent accidental or malicious transmission of secret data by the telephone.

Figure 7D:
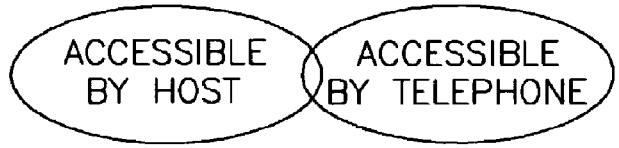

FIG. 7D shows an example where each of the host and telephone have exclusive and shared storage area. It should be noted that the exclusion and sharing for reading may be different than for writing.

Figure 7E:
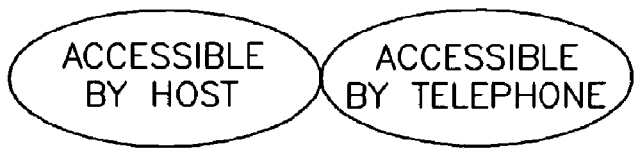

FIG. 7E shows an example where there is no shared storage area. This is useful, for example, if no functional integration is provided between the telephone and the host with respect to the memory. However, in some implementations, when the telephone accesses the host via the USB connector, the host may then access the host-accessible area at the telephone's behest.

In the examples of FIGS. 7B-7E it may be useful to have a plurality of flash memory modules and/or controllers, for example to provide separate modules or controllers to areas that are only accessible by one of the host and telephone.

While this sharing has been described for a storage space it is noted that in some embodiments of the invention, the storage space or the flash storage system are used to emulate various peripherals or functions, such as a modem or printer. The sharing configurations may be applied to such services in some embodiments of the invention.

It is also noted that flash storage system 110 may be exposed to the host or the telephone as a plurality of storage areas rather than as a single memory or hard disk area. Various partitioning, access rules, protection rules and/or encryption may be provided for each such storage area.

It should be noted that in some cases not all hosts will desire to access flash storage system 110 in a same file format. Further, the telephone may not support the same file system or format as host 102. In an exemplary embodiment of the invention, one or more file system emulators are executed by flash storage system 110 to emulate a same set of data as multiple file systems, to different hosts and/or the telephone. Possibly, file management data, such as FAT tables are stored (and updated) in multiple formats for these systems.

Circuit Design

The above integration of a flash storage system with a telephone can be achieved in many ways. Below are described some exemplary circuit designs which may be useful for such or other applications.

Figure 8:
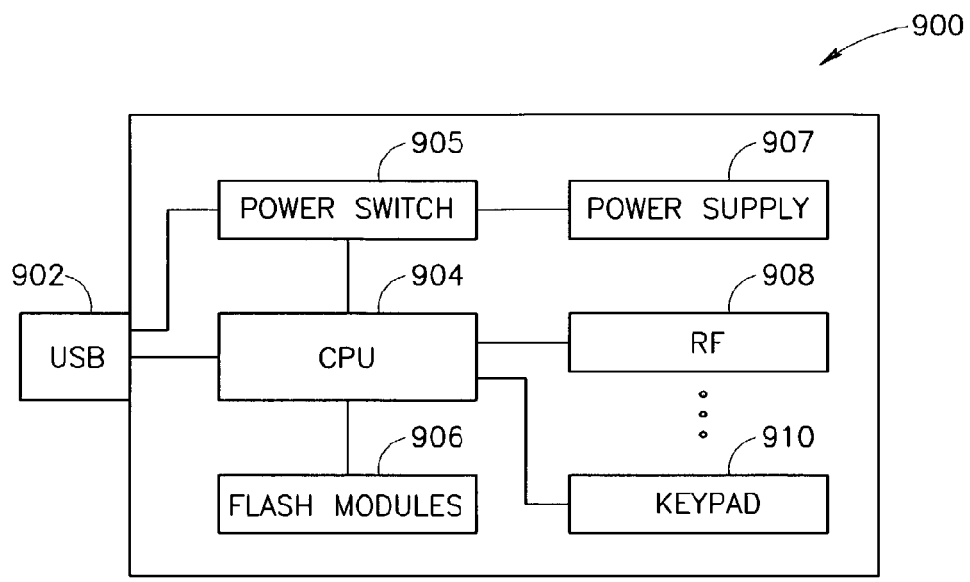
FIGS. 8 and 9 illustrate exemplary embodiments of the invention in which a CPU is shared or is not shared between a telephone and a flash storage system.
Figure 9:
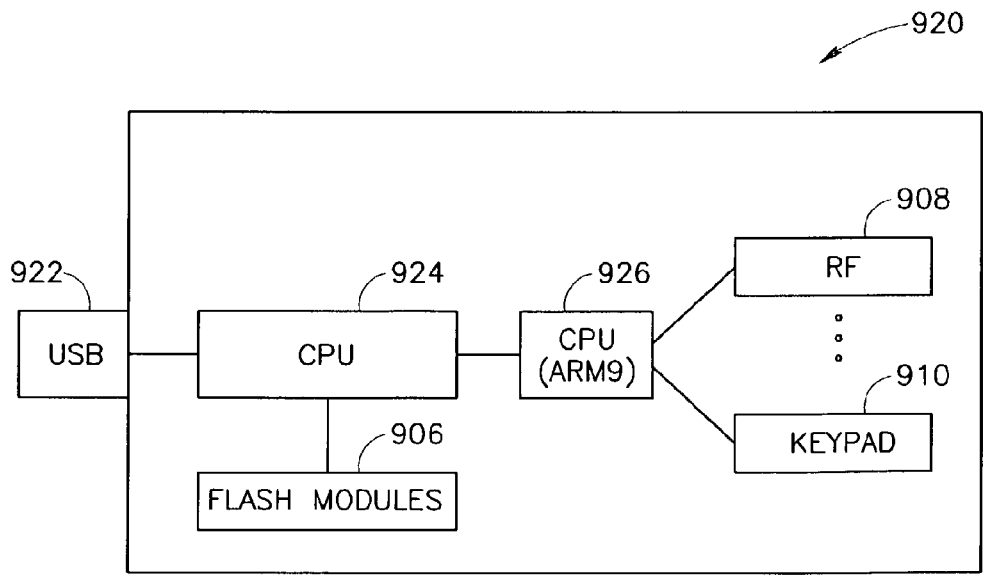

FIGS. 8 and 9 illustrate exemplary embodiments of the invention in which a CPU is shared or is not shared between a telephone and a flash storage system.

In FIG. 8, a telephone 900 includes a USB connector 902 (which optionally includes USB interface circuitry). A single CPU 904 controls one or more flash memory modules 906 and various telephone subsystems, such as RF 908 and keypad 910. Various functionalities such as USB negotiation may be implemented in hardware in a separate circuit associated with the USB connector, or implemented in software on CPU 904. Optionally, a single integrated circuit is provided with both CPU functions and USB interface functions.

In an exemplary embodiment of the invention, CPU 904 (and possibly flash memory modules 906) can be selectively powered by the USB connection or by an internal power source 907, optionally depending on whether a host is connected to the USB connection. In an exemplary embodiment of the invention, a power switch 905 is provided for selectively providing power from one or the other source.

In an exemplary embodiment of the invention, all the circuit components are provided in a single integrated circuit, for example an ASIC (application specific integrated circuit).

In FIG. 9, a telephone 920 includes a dedicated flash memory controller and/or CPU 924 (which optionally also provides a USB interface, so that a simple physical USB connector 922 may be used), and which is attached to a telephone CPU 926, for example an ARM 9 CPU.

In some embodiments of the invention, the USB controller includes both slave functionality (e.g., for connection to a host) and master functionality (e.g., for connecting and/or powering peripherals). In some cases, two USB ports, one incoming and one outgoing are provided in the telephone. Alternatively, a single multi-use connector is provided. Telephone 108 may automatically detect if it is connected to a host device or to a slave device. Optionally, an interface conforming to a USB on-the-go standard is used.

Figure 10:
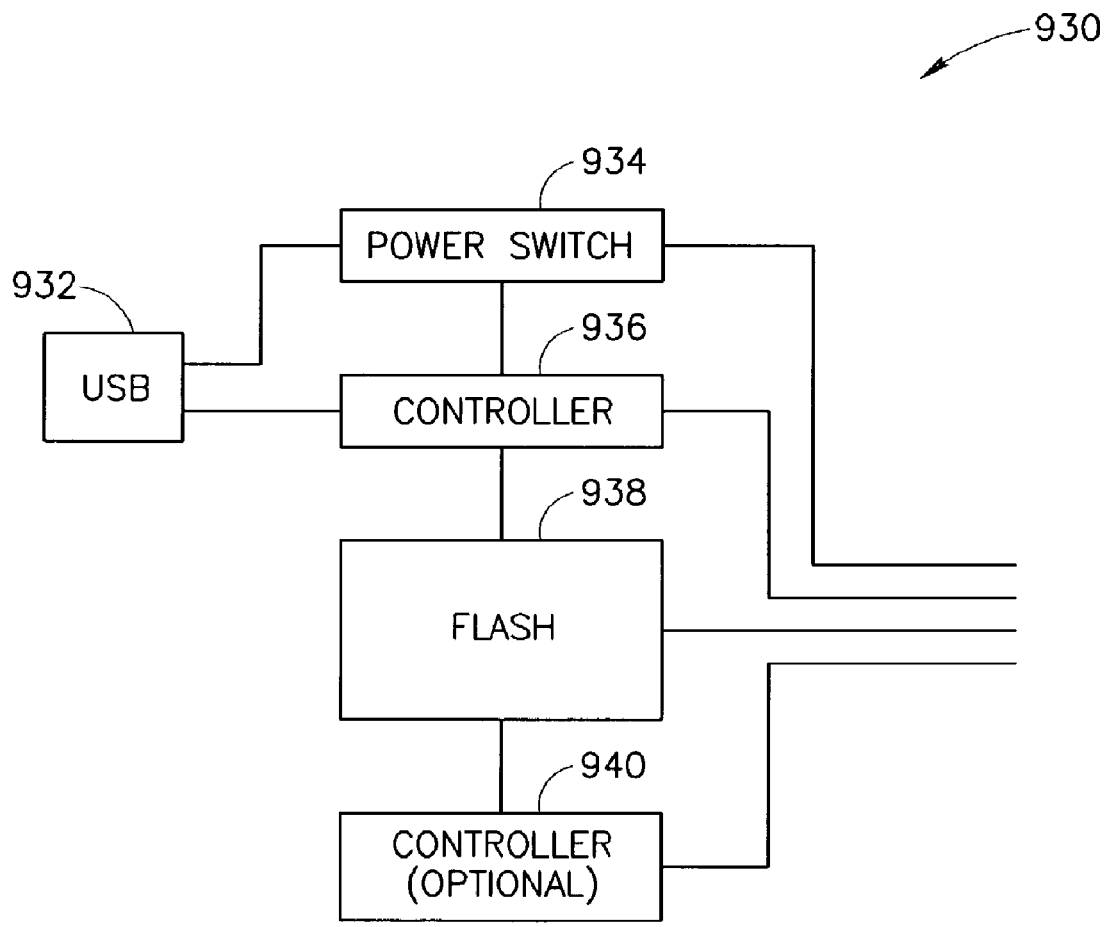
FIG. 10 illustrates an exemplary embodiment of the invention in which a flash storage system can be selectably powered from a USB connection or a dedicated power line.

FIG. 10 illustrates an exemplary embodiment of the invention in which a flash storage system 930 can be selectably powered from a USB connection or a dedicated power line.

In one operation mode, power and commands (or USB signals, depending on the implementation) are provided from a USB interface 932 to a controller 936, which then controls one or more flash memory modules 938. Module 938 may be powered directly or via controller 936, depending on the implementation.

In another operation mode, at least power (if not data) is provided from another source, and is switched by a power switch 934 which may be, for example, internal or external to controller 936. Commands may be provided by the same controller 936 or by a different optional controller 940, in which case controller 936 may remain powered off and only flash module 938 powered by the other power source.

In an exemplary embodiment of the invention, circuit 930 provides on the one hand hard-disk emulation via its USB connection and on the other hand hard-disk emulation suitable for an embedded device, for example as provided by the Disk-On-Chip product line sold by M-systems, LTD of Kfar-Saba, Israel. In an exemplary embodiment of the invention, the embedded-emulation is bootable and uses, for example, an SRAM interface.

In an exemplary embodiment of the invention, when a system is booted from circuit 930, the SRAM interface reads a BIOS-like section from module 938 and acts towards the system as a memory from which the system may be booted. As this reading may take some time, the SRAM interface may suspend the CPU of the system (e.g., using a bus busy signal). Then, a same system bus as used to access the SRAM may be used to read the operating system (if any) from module 938. Optionally, the system bus accesses a logic circuit in the SRAM interface, which bypasses actually loading the data into the SRAM. Once the operating system is up and USB support is available, the operating system may then access module 938 using the USB support rather than via the system bus and the logic circuit. Alternatively, the USB support may be available even before the whole operating system is loaded, so no logic circuit is needed.

In this and other dual mode circuits, mode switching may be provided, for example based on the power source or on the active signal lines. Alternatively or additionally, dual commanding is possible. Alternatively or additionally, software mode switching, via special commands is provided.

Bootable Flash Storage

Figure 11:
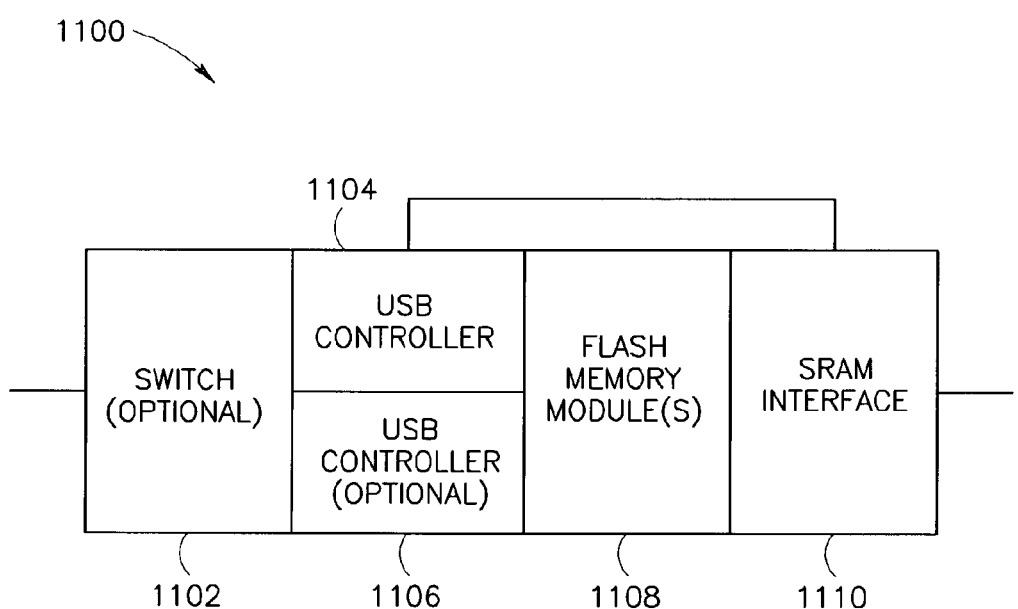
FIG. 11 is a schematic block diagram of an integrated circuit that embodies a flash memory system with two USB connections, in accordance with an exemplary embodiment of the invention.

FIG. 11 is a schematic block diagram of an integrated circuit 1100 that embodies a flash memory system with one or two USB connections, in accordance with an exemplary embodiment of the invention. In an exemplary embodiment of the invention, a CPU with an integral USB connection is provided. However, it cannot generally boot from the USB connection.

Circuit 1100 includes a flash memory module 1108 which can be controlled via a USB controller 1104 (or other type of connection protocol). In addition, a second connection type, for example an SRAM interface 1110, is provided. Optionally, interface 1110 directly controls flash memory module 1108 or uses a controller portion of USB controller 1104, optionally bypassing the USB protocol handling portion of controller 1104.

Optionally, a second USB connection is provided, for example for external control. A second USB controller 1106 may be provider. Alternatively or additionally, a switch 1102 is provided to switch commands and/or signals to the suitable controller. Power is optionally switched for example, as described above.

In an exemplary embodiment of the invention, the SRAM interface is used for booting and once booting is completed, data transfer is accomplished using a USB (or other) interface which can often be considerably faster than a bootable SRAM interface.

In an exemplary embodiment of the invention, circuit 1100 is packaged as a single integrated circuit suitable for embedding in devices, for example, a cellular telephone as described above.

Exemplary Variations

The above has described a telephone with an embedded flash storage system. Optionally, the flash storage system is removable, for example being a flash card of some type which is sealed in a receptacle on the telephone. Optionally, the telephone does not need to be powered down to remove the card.

In an alternative embodiment of the invention, the telephone includes a USB port (or other protocol) to which a USB-connecting flash memory system is attached. Optionally, the combined telephone and memory system acts as described above. Alternatively or additionally, the act of attaching the flash memory system to the telephone emulates the act of turning on or passing control over to the telephone. Optionally, a dual port USB flash memory storage device is used, so it can be connected in parallel to the telephone and a host.

It will be appreciated that the above described methods and apparatus of integrated telephone storage systems may be varied in many ways, including, changing the order of steps and the types of components used. For example, a wide range of non-volatile solid state memories can be used, for example of RAM type and of FLASH type (e.g., NAND or NOR). The term "flash memory", except where otherwise noted, is used in the specification as a generic term for such memory modules. In addition, a multiplicity of various features, both of method and of devices have been described. In some embodiments mainly methods are described, however, also apparatus adapted for performing the methods are considered to be within the scope of the invention. It should be appreciated that different features may be combined in different ways. In particular, not all the features shown above in a particular embodiment are necessary in every similar embodiment of the invention. Further, combinations of the above features are also considered to be within the scope of some embodiments of the invention. Also, within the scope is software and computer readable-media including such software which is used for carrying out and/or guiding the steps described herein, such as partitioning and providing e-mail functionality. Also, it should be noted that the various circuits described maybe, in some embodiments, provided as single integrated circuits and in others as a set of circuits and/or other discrete components. When used in the following claims, the terms "comprises", "includes", "have" and their conjugates mean "including but not limited to".

It will be appreciated by a person skilled in the art that the present invention is not limited by what has thus far been described. Rather, the scope of the present invention is limited only by the following claims.

The invention claimed is:

1. A method of sending e-mail from a computer, comprising:
   attaching a telephone to a computer;
   saving at least one e-mail message from said computer on said telephone;
   detaching said telephone; and
   automatically sending said e-mail message after said detaching.

2. A method according to claim 1, wherein said saving is transparent to a user of said computer, as compared to a regular e-mail transmission process.

3. A method according to claim 1, wherein said automatically sending is carried out at a delay after said detaching.

4. A method according to claim 1, wherein said telephone emulates an e-mail server to said computer.

5. A method according to claim 1, wherein an RF circuit of said telephone is powered off during said saving.

6. A method of sending e-mail from a computer, comprising:
   attaching a telephone to a computer, the telephone including a hard-disk emulator on which a mailbox file accessed by an e-mail application of the computer, is stored;
   saving at least one e-mail message from the computer on the telephone;
   activating the telephone; and
   automatically sending the e-mail message after said activating.

7. A method according to claim 6, wherein said saving is transparent to a user of the computer, as compared to a regular e-mail transmission process.

8. A method according to claim 6, wherein said activating comprises detaching the telephone.

9. A method according to claim 8, wherein said automatically sending is carried out at a delay after said detaching.

10. A method according to claim 6, wherein said activating comprises turning on an RF subsystem of the telephone.

11. A method according to claim 6, wherein said activating comprises entering a coverage area of a base station for the telephone.

12. A method according to claim 6, wherein the telephone emulates an e-mail server to the computer.

13. A method according to claim 6, wherein an RF circuit of the telephone is powered off during said saving.

\* \* \* \* \*